US 8,538,012 B2

(12) United States Patent
Dixon et al.

(10) Patent No.: US 8,538,012 B2
(45) Date of Patent: Sep. 17, 2013

(54) PERFORMING AES ENCRYPTION OR DECRYPTION IN MULTIPLE MODES WITH A SINGLE INSTRUCTION

(75) Inventors: Martin Dixon, Portland, OR (US); Srinivas Chennupaty, Portland, OR (US); Shay Gueron, Haifa (IL)

(73) Assignee: Intel Corporation, Santa Clara, CA (US)

(*) Notice: Subject to any disclaimer, the term of this patent is extended or adjusted under 35 U.S.C. 154(b) by 1538 days.

(21) Appl. No.: 11/724,005

(22) Filed: Mar. 14, 2007

(65) Prior Publication Data

US 2008/0229116 A1  Sep. 18, 2008

(51) Int. Cl.
*H04K 1/00* (2006.01)
*H04L 9/08* (2006.01)
*G06F 12/14* (2006.01)

(52) U.S. Cl.
USPC ............. 380/28; 380/29; 380/37; 380/284; 713/170; 713/190

(58) Field of Classification Search
USPC ............................................ 380/28
See application file for complete search history.

(56) References Cited

U.S. PATENT DOCUMENTS

| | | | | |
|---|---|---|---|---|
| 6,118,870 A * | 9/2000 | Boyle et al. | ............. | 380/201 |
| 6,324,288 B1 * | 11/2001 | Hoffman | ............. | 380/249 |
| 6,704,871 B1 * | 3/2004 | Kaplan et al. | ............. | 713/192 |
| 6,937,727 B2 * | 8/2005 | Yup et al. | ............. | 380/37 |
| 7,106,860 B1 * | 9/2006 | Yu et al. | ............. | 380/37 |
| 7,295,671 B2 * | 11/2007 | Snell | ............. | 380/28 |
| 7,496,196 B2 * | 2/2009 | Jalfon et al. | ............. | 380/29 |
| 7,509,501 B2 | 3/2009 | Park et al. | | |
| 7,532,726 B2 | 5/2009 | Fukuoka et al. | | |
| 2003/0202658 A1 * | 10/2003 | Verbauwhede | ............. | 380/43 |
| 2004/0148512 A1 | 7/2004 | Park et al. | | |
| 2004/0184602 A1 * | 9/2004 | Nadehara | ............. | 380/28 |
| 2004/0202317 A1 * | 10/2004 | Demjanenko et al. | ............. | 380/28 |

(Continued)

FOREIGN PATENT DOCUMENTS

CN 1677921 A 10/2005
EP 1496421 A2 1/2005

(Continued)

OTHER PUBLICATIONS

Tillich, S. et al, 'An Instruction Set Extension for Fast and Memory-Efficient AES Implementation', International Federation for Information Processing 2005, CMS 2005, LNCS 3677, pp. 11-21, 2005, http://citeseerx.ist.psu.edu/viewdoc/download?doi=10.1.1.83.55&rep=rep1&type=pdf.*

(Continued)

*Primary Examiner* — Edan Orgad
*Assistant Examiner* — Ronald Baum
(74) *Attorney, Agent, or Firm* — Trop, Pruner & Hu, P.C.

(57) ABSTRACT

A machine-readable medium may have stored thereon an instruction, which when executed by a machine causes the machine to perform a method. The method may include combining a first operand of the instruction and a second operand of the instruction to produce a result. The result may be encrypted using a key in accordance with an Advanced Encryption Standard (AES) algorithm to produce an encrypted result. The method may also include placing the encrypted result in a location of the first operand of the instruction.

16 Claims, 6 Drawing Sheets

(56) References Cited

U.S. PATENT DOCUMENTS

| | | | |
|---|---|---|---|
| 2004/0223610 A1 | 11/2004 | Henry et al. | |
| 2005/0058285 A1* | 3/2005 | Stein et al. | 380/29 |
| 2005/0147239 A1 | 7/2005 | Chin et al. | |
| 2005/0286720 A1 | 12/2005 | Fukuoka et al. | |
| 2006/0147040 A1* | 7/2006 | Lee et al. | 380/28 |
| 2007/0098153 A1* | 5/2007 | Nishikawa | 380/30 |
| 2007/0177627 A1* | 8/2007 | Raju et al. | 370/469 |
| 2008/0069339 A1* | 3/2008 | Parveen et al. | 380/28 |

FOREIGN PATENT DOCUMENTS

| | | |
|---|---|---|
| EP | 1519509 A2 | 3/2005 |
| EP | 1596530 A1 | 11/2005 |
| GB | 0804870.4 | 4/2008 |
| JP | 7-261662 | 10/1995 |
| JP | 2004-233427 | 8/2004 |

OTHER PUBLICATIONS

Bos, J., et al, 'Efficient Hashing using the AES Instruction Set', 2010, Dept of CS, Univ. of Bristol, UK, entire document, http://eprint.iacr.org/2010/576.pdf.*

VIA Technologies, VIA PadLock Programming Guide, May 3, 2005, pp. 1-55.

Korean Patent Application 10-2008-24067, office action dated Feb. 18, 2010, 6 pages.

Office Action Received for Chinese Patent Application No. 200810096342.2, mailed on Apr. 1, 2010, 4 Pages of Chinese Office Action, and 4 Pages of English Translation.

Combined Search and Examination Report received for United Kingdom Patent Application No. GB0804870.4, mailed on Jun. 25, 2008, 7 pages.

Astarloa, A. et al., "Multi-architectural 128 bit AES-CBC Core based on Open-Source Hardware AES Implementations for secure industrial communications", International Conference on Communication Technology, Nov. 27-30, 2006, 6 pages.

Office action dated May 15, 2009 from German application No. 10 2008 014 359.6-31, 6 pages.

"2004 IEEE Workshop on Signal processing Systems design and Implementation", published 2004, IEEE, pp. 152-157 Nadehara et al. "Extended Instructions for the AES cryptography and their efficient implementattion". See whole document.

State Intellectual Property Office of the People's Republic of China, Office Action mailed Jun. 5, 2012 in Chinese application No. 200810096342.2.

Korean International Patent Office, Office Action mailed Sep. 24, 2012 in Korean application No. 10-2010-59386.

Japanese Patent Office, Office Action mailed Jan. 25, 2011 in Japanese patent application No. 2008-0064272.

Chinese Patent Office, Office Action mailed Dec. 9, 2011 in Chinese application No. 200810096342.2.

* cited by examiner

ECB Mode Encryption Using New Instruction ⟵ 410

```
          MOV XMM0, Key      # Load the key from memory or another register
          MOV ECX, 16        # Number of 128-bit blocks to encrypt
Loop:
          MOV XMM1, 0        # Clear out the register for ECB mode.
          AESENCRYPT XMM1, PlainMemory[ECX]   # Do the EBC encryption
          MOV CipherMemory[ECX], XMM1 # Store the ciphertext
          DEC ECX # Decrement the loop counter
310       JNE Loop # Jump back to the Loop
```

CBC Mode Encryption Using New Instruction ⌠710

```
        MOV XMM0, Key         # Load the key from memory or another register
        MOV ECX, 16           # Number of 128-bit blocks to encrypt
        MOV XMM1, 0           # Clear the Ciphertext prior to calling encrypt
    Loop:
        AESENCRYPT XMM1, PlainMemory[ECX]   # Do the CBC encryption
        MOV CipherMemory[ECX], XMM1 # Store the ciphertext
        DEC ECX # Decrement the loop counter
310     JNE Loop # Jump back to the Loop
```

Fig. 7

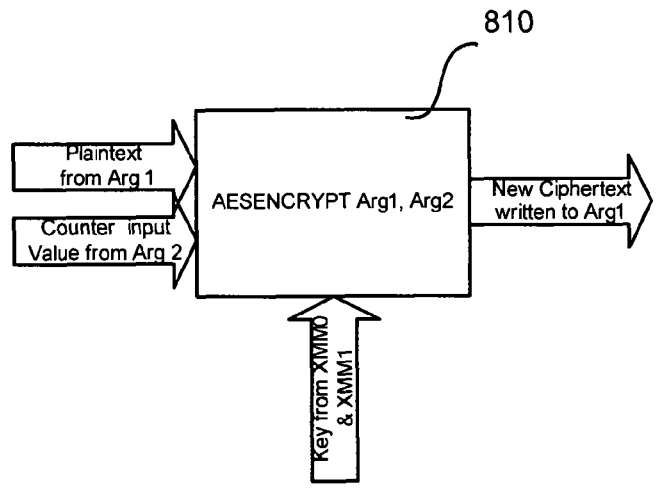

Fig. 8

CTR Mode Encryption Using New Instruction — 910

```
        MOV XMM0, Key              # Load the key from memory or another register
        MOV ECX, 16                # Number of 128-bit blocks to encrypt
        MOV XMM4, Counter          # The counter
Loop:
        MOV XMM3, PlainMemory[ECX]     # Load the Plaintext into a register
        AESENCRYPT XMM3, XMM4          # Do the CTR encryption
        MOV CipherMemory[ECX], XMM3    # Store the ciphertext
        ADD XMM4, Count                # Increment the counter by Count
        DEC ECX                        # Decrement the loop counter
        JNE Loop                       # Jump back to the Loop
```

PERFORMING AES ENCRYPTION OR DECRYPTION IN MULTIPLE MODES WITH A SINGLE INSTRUCTION

BACKGROUND

Implementations of the claimed invention generally may relate to processors, and in particular to instructions for causing processors to perform Advanced Encryption Standard (AES) encryption or decryption.

AES is the advanced encryption standard from the National Institute of Standards and Technology (NIST), and is defined in FIPS Publication 197. AES may have a variable key size. There are 3 acceptable key sizes: 128-bit, 192-bit and 256-bit. AES encryption takes 128-bits plaintext input and a key, and then produces 128-bits of ciphertext (e.g., plaintext that has been AES encrypted) output. Similarly, AES decryption performs an opposite operation where it takes 128-bits ciphertext and a key to produce 128-bits of plaintext.

AES may be used in many modes of operation. One of the more common modes is the so-called Cipher-Block Chaining (CBC) mode. A somewhat less common mode is the so-called Electronic Codebook (ECB) mode. Other modes are also possible, such as the emergent so-called Counter mode (CTR), which is conceptually similar to ECB.

In computing systems, it may be desirable to have an instruction or instructions for a processor that is dedicated to AES encryption and/or decryption.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

FIG. 7 illustrates example code for using the AES encryption instruction in CBC mode;

FIG. 8 conceptually illustrates an AES encryption instruction used in CTR mode; and FIG. 9 illustrates example code for using the AES encryption instruction in CTR mode.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Overview

This application describes embodiments of methods, apparatuses and systems for including in a processor instructions for performing AES encryption and/or decryption. Two such instructions are:

AESENCRYPT (arg1)xmmdestination, (arg2)xmmsource/memory

AESDECRYPT (arg1)xmmdestination, (arg2)xmmsource/memory

The xmmsource/memory supplies the plaintext to be used in the encryption case, and the xmmdestination will be the ciphertext. In the decryption case the roles are reversed, and the source is ciphertext with the destination being plaintext. In some implementations, both operands may be used to encrypt or decrypt, as will be explained further below. In both cases the encryption key is supplied to the AESENCRYPT and/or AESDECRYPT instruction through the use of one or more 128-bit implicit registers (e.g., XMM0 & XMM1 as will be described in greater detail below).

Although much of the following description will focus on the encryption instruction, AESENCRYPT, those skilled in the encryption arts will understand that the decryption instruction, AESDECRYPT, may also be substituted and/or used in a similar way for decryption. Describing primarily AESENCRYPT is done purely for clarity and ease of description, and does not indicate that one of the instructions is any more important than the other.

Computer System

Figure 1:
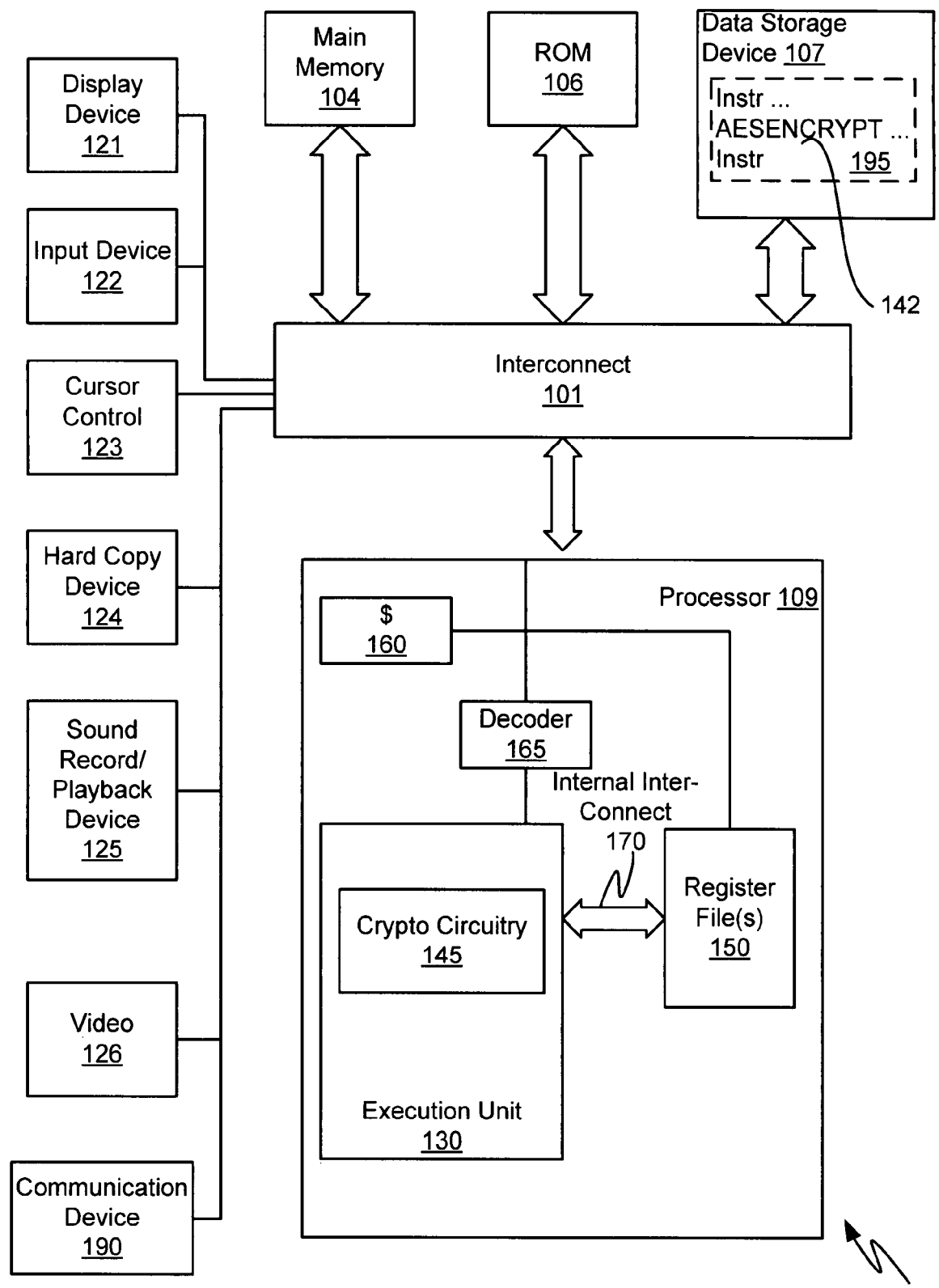
FIG. 1 illustrates an example computer system according to some implementations.

FIG. 1 illustrates an example computer system 100 according to one embodiment of the invention. Computer system 100 includes an interconnect 101 for communicating information. The interconnect 101 may include a multi-drop bus, one or more point-to-point interconnects, or any combination of the two, as well as any other communications hardware and/or software.

FIG. 1 illustrates a processor 109, for processing information, coupled with interconnect 101. Processor 109 represents a central processing unit of any type of architecture, including a CISC or RISC type architecture.

Computer system 100 further includes a random access memory (RAM) or other dynamic storage device (referred to as main memory 104), coupled to interconnect 101 for storing information and instructions to be executed by processor 109. Main memory 104 also may be used for storing temporary variables or other intermediate information during execution of instructions by processor 109.

Computer system 100 also includes a read only memory (ROM) 106, and/or other static storage device, coupled to interconnect 101 for storing static information and instructions for processor 109. Data storage device 107 is coupled to interconnect 101 for storing information and instructions.

FIG. 1 also illustrates that processor 109 includes an execution unit 130, a register file 150, a cache 160, a decoder 165, and an internal interconnect 170. Of course, processor 109 contains additional circuitry that is not necessary to understanding the invention.

Decoder 165 is for decoding instructions received by processor 109 and execution unit 130 is for executing instructions received by processor 109. In addition to recognizing instructions typically implemented in general purpose processors, decoder 165 and execution unit 130 recognize instructions, as described herein, for performing AES encryption or decryption (AESENCRYPT or AESDECRYPT) operations. The decoder 165 and execution unit 130 recognize instructions for performing AESENCRYPT or AESDECRYPT operations on both packed and unpacked data.

Execution unit 130 is coupled to register file 150 by internal interconnect 170. Again, the internal interconnect 170 need not necessarily be a multi-drop bus and may, in alternative embodiments, be a point-to-point interconnect or other type of communication pathway.

Register file(s) 150 represents a storage area of processor 109 for storing information, including data. It is understood that one aspect of the invention is the described instruction embodiments for performing AESENCRYPT or AESDECRYPT operations on packed or unpacked data. According to this aspect of the invention, the storage area used for storing the data is not critical. However, embodiments of the register file 150 are later described with reference to FIG. 2.

Execution unit 130 is coupled to cache 160 and decoder 165. Cache 160 is used to cache data and/or control signals from, for example, main memory 104. Decoder 165 is used for decoding instructions received by processor 109 into control signals and/or microcode entry points. These control signals and/or microcode entry points may be forwarded from the decoder 165 to the execution unit 130.

In response to these control signals and/or microcode entry points, execution unit 130 performs the appropriate operations. For example, if an AESENCRYPT or AESDECRYPT instruction is received, decoder 165 causes execution unit 130 to perform the required bit encryption or decryption. For at least some embodiments, the execution unit 130 may encrypt or decrypt 128 bits of plaintext or ciphertext using one or more keys (see, e.g., crypto circuitry 145).

Decoder 165 may be implemented using any number of different mechanisms (e.g., a look-up table, a hardware implementation, a PLA, etc.). Thus, while the execution of the various instructions by the decoder 165 and execution unit 130 may be represented herein by a series of if/then statements, it is understood that the execution of an instruction does not require a serial processing of these if/then statements. Rather, any mechanism for logically performing this if/then processing is considered to be within the scope of the invention.

FIG. 1 additionally shows a data storage device 107 (e.g., a magnetic disk, optical disk, and/or other machine readable media) can be coupled to computer system 100. In addition, the data storage device 107 is shown to include code 195 for execution by the processor 109. The code 195 can include one or more embodiments of an AESENCRYPT or AESDECRYPT instruction 142, and can be written to cause the processor 109 to perform bit AES encryption or decryption with the AESENCRYPT or AESDECRYPT instruction(s) 142 for any number of security-related purposes.

Computer system 100 can also be coupled via interconnect 101 to a display device 121 for displaying information to a computer user. Display device 121 can include a frame buffer, specialized graphics rendering devices, a liquid crystal display (LCD), and/or a flat panel display.

An input device 122, including alphanumeric and other keys, may be coupled to interconnect 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device that may be coupled to interconnect 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device 125 may include a speaker which is coupled to a digital to analog (D/A) converter for playing back the digitized sounds.

Computer system 100 can be a terminal in a computer network (e.g., a LAN). Computer system 100 would then be a computer subsystem of a computer network. Computer system 100 optionally includes video digitizing device 126 and/or a communications device 190 (e.g., a serial communications chip, a wireless interface, an Ethernet chip or a modem, which provides communications with an external device or network). Video digitizing device 126 can be used to capture video images that can be transmitted to others on the computer network.

For at least one embodiment, the processor 109 supports an instruction set that is compatible with the instruction set used by existing processors (such as, e.g., the Intel® Pentium® Processor, Intel® Pentium® Pro processor, Intel® Pentium® II processor, Intel® Pentium® III processor, Intel® Pentium® 4 Processor, Intel® Itanium® processor, Intel® Itanium® 2 processor, or the Intel® Core™ Duo processor) manufactured by Intel Corporation of Santa Clara, Calif. As a result, processor 109 can support existing processor operations in addition to the operations of the invention. Processor 109 may also be suitable for manufacture in one or more process technologies and by being represented on a machine readable media in sufficient detail, may be suitable to facilitate said manufacture. While the invention is described below as being incorporated into an x86 based instruction set, alternative embodiments could incorporate the invention into other instruction sets. For example, the invention could be incorporated into a 64-bit processor using an instruction set other than the x86 based instruction set.

Figure 2:
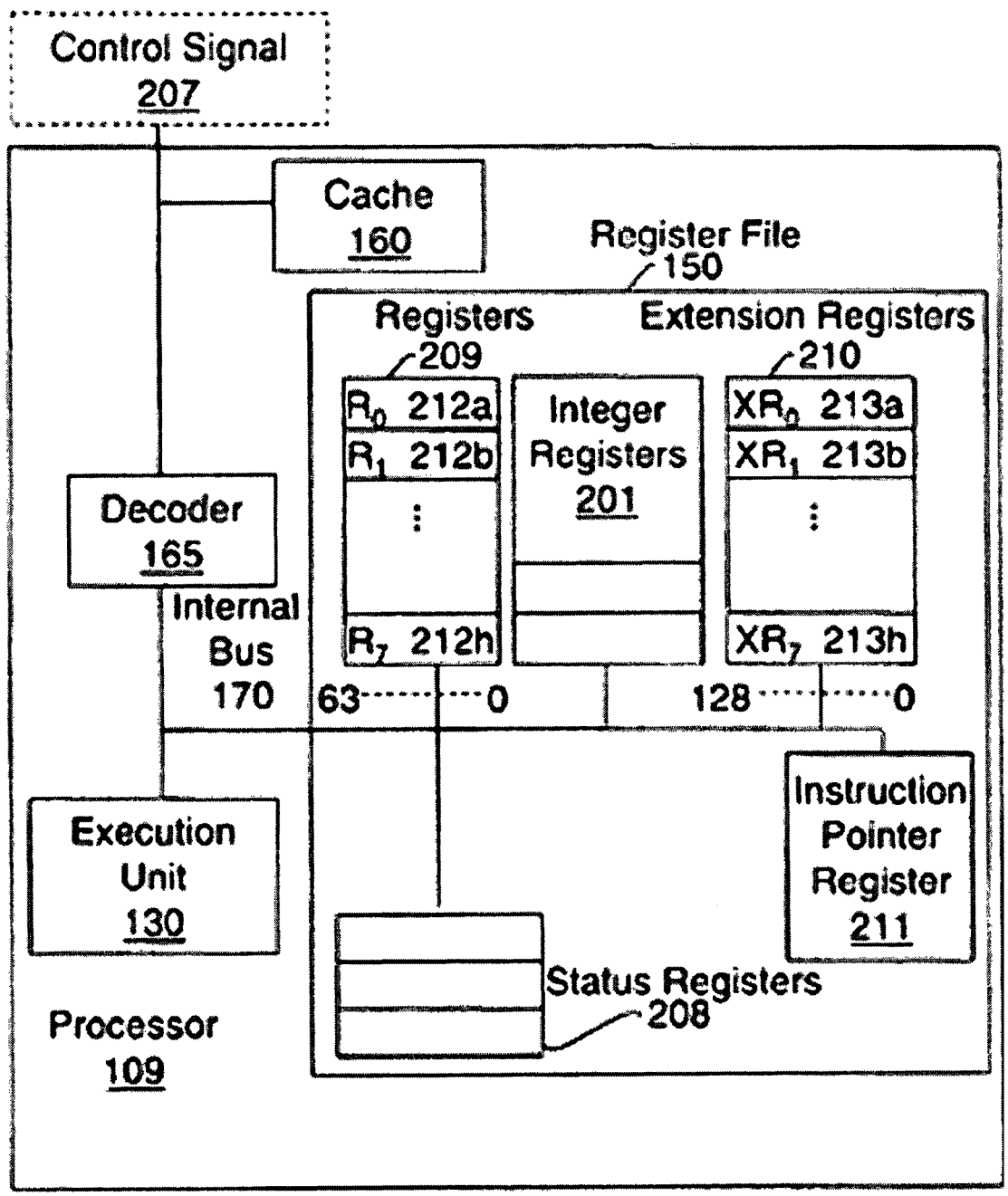
FIG. 2 illustrates register files of a processor according to some implementations.

FIG. 2 illustrates the register file of the processor according to one alternative embodiment of the invention. The register file 150 may be used for storing information, including control/status information, integer data, floating point data, and packed data. In the embodiment shown in FIG. 2, the register file 150 includes integer registers 201, registers 209, status registers 208, extension registers 210, and instruction pointer register 211. Status registers 208, instruction pointer register 211, integer registers 201, registers 209, are all coupled to internal interconnect 170. Additionally, extension registers 210 are also coupled to internal interconnect 170. The internal interconnect 170 may be, but need not necessarily be, a multi-drop bus. The internal interconnect 170 may instead may be any other type of communication pathway, including a point-to-point interconnect.

For at least one embodiment, the extension registers 210 are used for both packed integer data and packed floating point data. For alternative embodiments, the extension registers 210 may be used for scalar data, packed Boolean data, packed integer data and/or packed floating point data. Of course, alternative embodiments may be implemented to contain more or less sets of registers, more or less registers in each set or more or less data storage bits in each register without departing from the broader scope of the invention.

For at least one embodiment, the integer registers 201 are implemented to store thirty-two bits, the registers 209 are implemented to store eighty bits (all eighty bits are used for storing floating point data, while only sixty-four are used for packed data) and the extension registers 210 are implemented to store 128 bits. In addition, extension registers 210 may contain eight registers, XR0 213a through XR7 213h. XR0 213a, XR1 213b and XR2 213c are examples of individual registers in registers 210. For example, 128-bit extension registers 210 may be used to provide one or both operands for an AESENCYPT instruction, and may be used to provide one or both of the implicit registers (e.g., XMM0 & XMM1) used by the AESENCYPT instruction.

For another embodiment, the integer registers 201 each contain 64 bits, the extension registers 210 each contain 64 bits and extension registers 210 contains sixteen registers. For one embodiment two registers of extension registers 210 may be operated upon as a pair. For yet another alternative embodiment, extension registers 210 contains thirty-two registers.

AES Encryption and/or Decryption Operation(s)

Figures 3, 4:
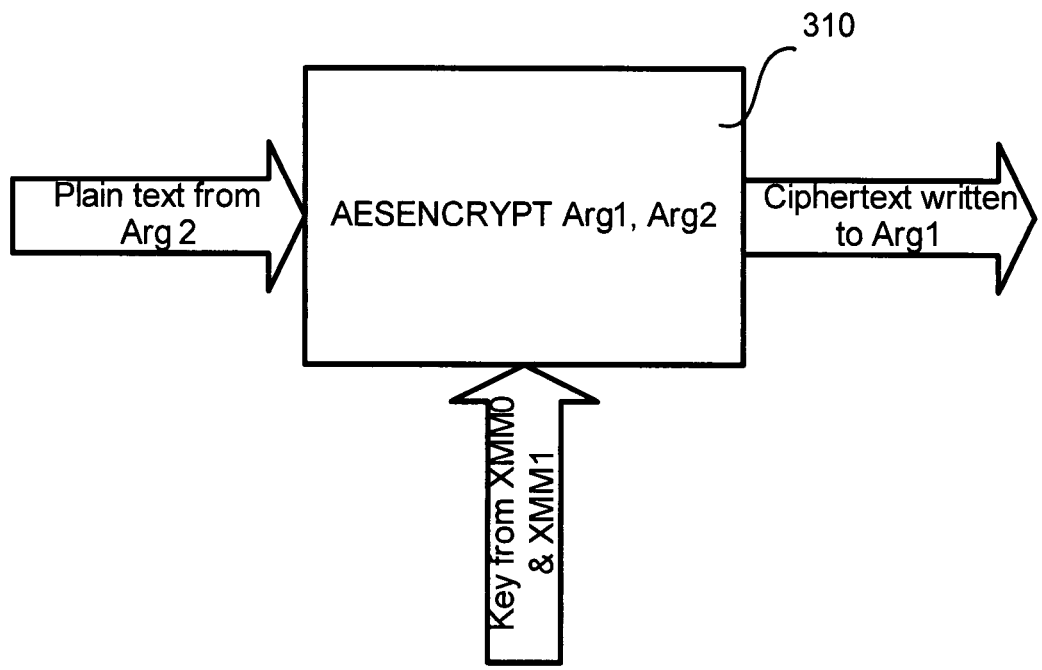
FIG. 3 conceptually illustrates an AES encryption instruction used in ECB mode.
FIG. 4 illustrates example code for using the AES encryption instruction in ECB mode.

FIG. 3 conceptually illustrates an AES encryption instruction (AESENCRYPT Arg1, Arg2) 310 used in ECB mode. As shown, AESENCRYPT 310 has two operands, one of which, Arg2, supplies the plaintext to be encrypted. The encrypted ciphertext is written to Arg1 of AESENCRYPT 310. The encryption key is supplied from one or more of the implicit 128-bit registers XMM0 and XMM1. If, for example, the encryption key is 128 bits in length, it may be supplied by one of the registers XMM0. In such a case, the other register XMM1 may be used in another capacity, as will be described with regard to FIG. 4.

As may be seen in FIG. 3, AESENCRYPT 310 is used in ECB mode by encrypting the plaintext from Arg2 with a key. One scheme to determine which mode (e.g., ECB, CBC, etc.) in which AESENCRYPT 310 operates is to use the operands to determine the mode. In one implementation, AESENCRYPT 310 exclusive ORs (XORs) its operands, Arg1 and Arg2 before encrypting the result with the key. Such scheme, which will be described in further detail with regard to FIG. 4, enables one or two inputs to AESENCRYPT 310. If only one input is desired, such as Arg2 for ECB mode as shown in FIG. 3, the other operand Arg1 may be set to zero so that the XOR operation by AESENCRYPT 310 yields just the first operand, Arg2, for encryption by the key. How this XORing scheme may be used for CBC and CTR mode will be further described with regard to FIGS. 5-9.

Another scheme (not shown) for determining in which mode AESENCRYPT 310 operates may be to employ an immediate byte in the AESENCRYPT 310 instruction in addition to the two operands Arg1 and Arg2. This second scheme, in contrast to the first where the operands are XORed, may specify how and/or whether to use one or both of the operands of AESENCRYPT 310 based on the content of the immediate byte. Other schemes than these two are both possible and contemplated to enable a single, two operand instruction, such as AESENCRYPT 310 (or AESDECRYPT) to be used in multiple different modes (e.g., ECB, CBC, CTR, etc.).

FIG. 4 illustrates example code (e.g., which when executed by processor 190 constitutes a method) 410 for using AESENCRYPT 310 in ECB mode. First the encryption key is loaded (via MOV instruction or similar) into one of the implicit registers XMM0. Next a value (e.g., 16) may be loaded (via MOV instruction or similar) into another register ECX to set the number of 128-bit blocks of plaintext to AES encrypt. This value multiplied by 128 bits may specify the total length of the plaintext to be encrypted by code 410. After such initialization, a loop including AESENCRYPT 310 may be executed ECX times.

Within the loop, the second implicit register XMM1 is cleared for ECB mode by loading a value of zero. As explained above, this value of zero when XORed by AESENCRYPT 310 with the second operand, produces the second operand which is the desired result to operate in ECB mode. Turning to the next instruction, AESENCRYPT 310 takes the plaintext in Plainmemory[ECX], encrypts the plaintext with the key in XMM0, and writes the result into the second implicit register XMM1. Next the ciphertext in XMM1 is stored to Ciphermemory[ECX] and the loop value in ECX is decremented before jumping back to the beginning of the loop.

At the next loop, XMM1 is again cleared of the encrypted result for the previous 128 bits. In this way, AESENCRYPT 310 has the single input of Plainmemory[ECX] for the decremented value in ECX to be encrypted by the key in XMM0. The looping execution of code 410 may continue until all blocks of plaintext specified by the initial value loaded into ECX have been AES encrypted in ECB mode.

Figure 5:
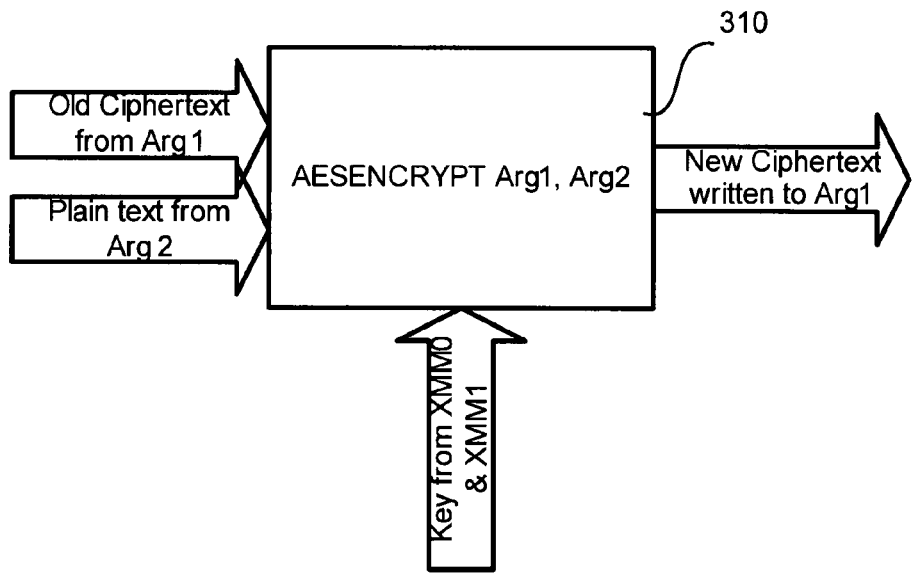
FIG. 5 conceptually illustrates an AES encryption instruction used in CBC mode.

FIG. 5 conceptually illustrates an AES encryption instruction (AESENCRYPT Arg1, Arg2) 310 used in CBC mode. As shown, AESENCRYPT 310 has two operands, one of which, Arg2, supplies the plaintext to be encrypted. In CBC mode, the other operand, Arg1, provides so-called "old" ciphertext from the prior encrypted block, which is XORed with the plaintext by AESENCRYPT 310 before encryption. The encryption key is supplied from one or more of the implicit 128-bit registers XMM0 and XMM1. The encrypted ciphertext for the current block is overwritten on Arg1 of AESENCRYPT 310.

Figure 6:
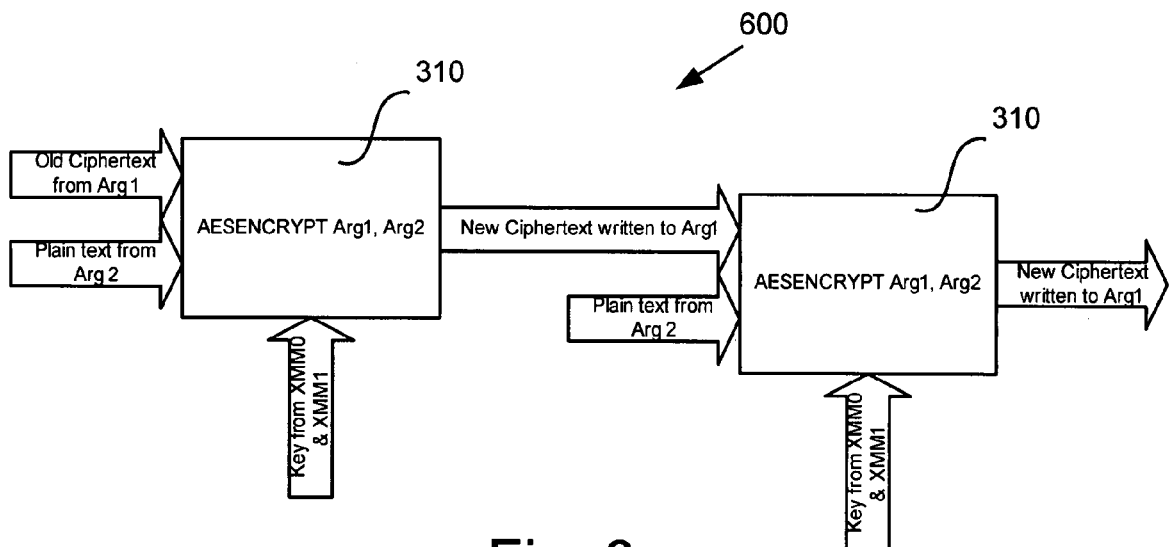
FIG. 6 conceptually illustrates two chained AES encryption instructions used in CBC mode.

FIG. 6 conceptually illustrates two chained AES encryption instructions 600 used in CBC mode. This visually shows the temporal nature of CBC mode (the first-in-time operation appearing on the left of the figure), where the result of the previous encryption block is XORed with the new plaintext. This produces a more random ciphertext than ECB mode (e.g., in ECB mode the same plaintext block will encrypt into the same ciphertext block given the same key). In CBC mode as shown in FIG. 6, the ciphertext for a given block of plaintext depends upon the ciphertext result of the previous round.

FIG. 7 illustrates example code (e.g., which when executed by processor 190 constitutes a method) 710 for using the AES encryption instruction in CBC mode. First the encryption key is loaded (via MOV instruction or similar) into one of the implicit registers XMM0. Next a value (e.g., 16, but this number may be higher or lower) may be loaded (via MOV instruction or similar) into another register ECX to set the number of 128-bit blocks of plaintext to AES encrypt. This value multiplied by 128 bits may specify the total length of the plaintext to be encrypted by code 710. Also, for the first time through the loop, XMM1 may be cleared by loading a zero, because there is no ciphertext from a prior block with which to combine with the first block of plaintext. After such initialization, a loop including AESENCRYPT 310 may be executed ECX times.

Within the loop, AESENCRYPT 310 takes the plaintext in Plainmemory[ECX], XORs it with the value in XMM1 (e.g., zero for the first time through the loop), encrypts the XORed result with the key in XMM0, and writes the result into the second implicit register XMM1 over the value that was already there. Next the ciphertext in XMM1 is stored to Ciphermemory[ECX] and the loop value in ECX is decremented before jumping back to the beginning of the loop.

At the next loop, and differently from ECB mode, the non-zero ciphertext result for the previous 128 bits in XMM1 is not cleared. Rather, it is XORed with the next block of plaintext by AESENCRYPT 310 prior to encryption with the key according to CBC mode. In this manner, AESENCRYPT 310 has the double inputs of Plainmemory[ECX] for the decremented value in ECX and the ciphertext value in XMM1 from the previous loop. The AESENCRYPT 310 instruction XORs the two inputs and encrypts the result with the key in XMM0. The looping execution of code 410 may continue until all blocks of plaintext specified by the initial value loaded into ECX have been AES encrypted in CBC mode.

The above-described scheme and system may advantageously perform CBC mode and ECB mode encryption using a single, two operand instruction. This instruction allows tighter loops for AES in its most common two modes. The instruction works with a limited number of operands, and moves the most common usage of AES into a single instruction which still supports the second most frequent usage.

FIG. 8 conceptually illustrates an AES encryption instruction (AESENCRYPT Arg1, Arg2) 810 used in CTR mode. As shown, AESENCRYPT 810 has two operands, one of which, Arg2, supplies the counter value to be encrypted. In CTR mode, the other operand, Arg1, provides the plaintext to be encrypted, which is XORed with the plaintext by AESENCRYPT 810 after encryption. The encryption key is supplied from one or more of the implicit 128-bit registers XMM0 and XMM1. The encrypted ciphertext for the current block is overwritten on Arg1 of AESENCRYPT 810.

FIG. 9 illustrates example code (e.g., which when executed by processor 190 constitutes a method) 910 for using the AES encryption instruction in CTR mode. First the encryption key is loaded (via MOV instruction or similar) into one of the implicit registers XMM0. Next a value (e.g., 16, but this number may be higher or lower) may be loaded (via MOV instruction or similar) into another register ECX to set the number of 128-bit blocks of plaintext to AES encrypt. This value multiplied by 128 bits may specify the total length of the plaintext to be encrypted by code 910. Next a Counter value is loaded (via MOV instruction or similar) into another XMM register (such as XMM4). After such initialization, a loop including AESENCRPT 810 may be executed ECX times.

Within the loop, AESENCRYPT 810 takes the counter value will actually encrypt the counter value and then perform the XOR with the plaintext data to produce the ciphertext. Next the ciphertext in XMM3 is stored to Ciphermemory [ECX] and the loop value in ECX is decremented before jumping back to the beginning of the loop. Afterwards, the counter is adjusted as appropriate (via an ADD, MUL or other instruction). The loop otherwise proceeds identically to ECB mode.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, although AES encryption and decryption have been described for a 128-bit key, the NIST standard in FIPS Publication 197 permits 192-bit and 256-bit keys. In such a case, XMM1 may be used for the other 64 bits or 128 bits in the 192-bit or 256-bit key. In such a case, some other 128 bit register (e.g., XMM2, XMM3, etc.) may be used instead of XMM1 in code 410 or code 710 or code 910 (or whatever code in which AESENCRYPT or AESDECRYPT resides), because a portion of the key is resident in XMM1.

Although AESENCRYPT has been described above, AESDECRYPT Arg1, Arg2 may be used in a similar manner to support AES decryption in ECB mode, CTR mode and in CBC mode. Those skilled in the art will recognize that use of AESDECRYPT in ECB mode is relatively straightforward, while CBC mode may entail additional computation, such as the inverse or opposite of the XOR operation performed by AESENCRYPT during encryption.

It should also be recognized that although the details of exactly how AESENCRYPT and AESDECRYPT perform the AES algorithm has not been presented, such is well within the capability of those skilled in the encryption arts. The particular implementation may tend to be optimized for the particular processor 190 on which AESENCRYPT and AESDECRYPT are executed. In some implementations, these instructions may be optimized in machine language for the most rapid execution possible. The details of such optimization are not particularly germane to the claimed invention, and have been omitted for clarity of explanation.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A machine-readable non-transitory storage medium having stored thereon an instruction, which when executed by a machine causes the machine to perform a method comprising:
    determining from a first operand of the instruction an Advanced Encryption Standard (AES) encryption mode by which to encrypt data;
    applying an exclusive OR operation to the first operand of the instruction and a second operand of the instruction to produce a combined result and encrypting the combined result using a key in accordance with the determined AES encryption mode to produce an encrypted result; and placing the encrypted result in a memory location of the first operand of the instruction.

2. The medium of claim 1, wherein the encrypting includes:
    obtaining the key from one or more predetermined registers.

3. The medium of claim 2, wherein the key is 128 bits or 256 bits in length.

4. The medium of claim 1, wherein the second operand is plaintext to be encrypted that is 128 bits in length.

5. The medium of claim 1, wherein the first operand is zero in a first AES encryption mode by which the result is encrypted.

6. The medium of claim 1, wherein the first operand is a prior encrypted result from a prior encryption operation in a second AES encryption mode by which the result is encrypted.

7. A processor to perform encryption, comprising:
    a first logic, responsive to execution of a single instruction that includes a first operand and a second operand and executable in a selected one of a plurality of Advanced Encryption Standard (AES) modes, to logically combine, via an exclusive OR operation (XOR), a plaintext value supplied by the second operand with a second value supplied by the first operand to produce a combined result, and to encrypt the combined result using an AES algorithm and a key to produce an encrypted result, wherein a particular mode of the plurality of the AES modes via which to produce the encrypted result is selected according to the first operand.

8. The processor of claim 7, further comprising:
a first register to store the second value; and
a second register to store the key.

9. The processor of claim 8, wherein the first logic is arranged to store the encrypted result in the first register.

10. The processor of claim 7, wherein the second value of zero is distinctly associated with a first mode of encryption and the second value of a previously encrypted result is distinctly associated with a second mode of encryption.

11. The processor of claim 7, wherein the plaintext value and the encrypted result are each 128 bits in length.

12. A system to encrypt data, comprising:
a memory to store an Advanced Encryption Standard (AES) encryption instruction having two operands; and
a processor to execute the AES encryption instruction according to a particular mode of a plurality of modes of the AES encryption instruction, the particular mode determined based on a value of one of the two operands, wherein:
in a first mode and responsive to execution of the AES encryption instruction, the
processor is to execute a first loop to clear a first operand, logically combine a plaintext value supplied by a second operand obtained from a first corresponding memory location of a first memory, the first corresponding memory location indicated by a counter value, with a second value supplied by the first operand to produce a combined result, encrypt the combined result using an AES algorithm and a key to produce an encrypted result, store the encrypted result in a second corresponding memory location of a second memory, the second corresponding memory location indicated by the counter value, decrement the counter value, and re-execute the first loop until the counter value reaches a predetermined value; and
in a second mode and responsive to the execution of the AES encryption instruction, the processor is to clear the first operand, and thereafter execute a second loop to logically combine the plaintext value with the second value to produce the combined result, encrypt the combined result using the AES algorithm and the key to produce the encrypted result, store the encrypted result in the second corresponding memory location of the second memory indicated by the counter value, decrement the counter value, and re-execute the second loop until the counter value reaches the predetermined value.

13. The system of claim 12, wherein the AES encryption instruction has only two operands.

14. The system of claim 12, wherein the at least two modes includes two of electronic codebook mode, counter mode, and cipher block chaining mode.

15. The system of claim 12, wherein when a first operand has a value of zero, the selected mode is electronic codebook (EBC).

16. The system of claim 12, wherein the plaintext value is logically combined with the second value via an XOR operation.

* * * * *